United States Patent Office

Re. 27,670
Reissued June 12, 1973

27,670

METHOD FOR PRODUCING A SMOKE-PREPARATION

Kazimierz Miler and Zbigniew Kozlowski, Warsaw, Poland, assignors to Instytut Przemyslu Miesnego, Warsaw, Poland No Drawing. Original No. 3,445,248, dated May 20, 1969, Ser. No. 510,737, Apr. 7, 1965. Application for reissue May 19, 1971, Ser. No. 145,074
Claims priority, application Poland, Apr. 8, 1964, 104,255
Int. Cl. A23b *1/04, 3/04*
U.S. Cl. 99—229 1 Claim

Matter enclosed in heavy brackets [ ] appears in the original patent but forms no part of this reissue specification; matter printed in italics indicates the additions made by reissue.

ABSTRACT OF THE DISCLOSURE

Method of obtaining smoke which imparts smell and taste similar to those of conventionally smoke-dried sausages and which is free of carcinogenic compounds and ballast. Wood is distilled in excess air and smoke therefrom is absorbed in *an* alkaline solution. Undesired compounds are extracted from *the* solution with *an* organic solvent. [Carbon dioxide is introduced into] *Phenolates contained in* the aqueous layer [to convert phenolates] *are converted* into phenols which are then also extracted with the organic solvent *and then dissolved in sausage material.* The remaining aqueous layer is [dissolved in sausage material] *discarded.*

*CROSS REFERENCE TO RELATED APPLICATIONS*

*This is an application for reissue of Pat. No. 3,445,248 granted on May 20, 1969 on an application, Ser. No. 510,737, filed Apr. 7, 1965.*

*BACKGROUND OF THE INVENTION*

*Field of the invention*

The present invention relates to a method of producing a smoke-preparation which when added to sausages imparts to them properties of smoke-dried sausages.

*Prior art*

The conventional method of exposing sauages to smoke consists in exposing the sausages to the action of smoke at elevated or non-elevated temperature. This method is work consuming, requires a long time and special rooms, and consequently it is expensive and cannot be mechanized in conjunction with a continuous sausages production line.

In order to avoid these inconveniences, preparations have been proposed which, when added to the raw material while it is being cut during size reduction prior to filling the gut, would replace the conventional method of exposing sausages to smoke. Known preparations of this kind consist of some fractions obtained during wood distillation carried out with a limited air supply which does not allow a full combustion of the wood. Preparations thus obtained reveal a plurality of inconveniences, namely the sausages' smell and taste obtained with their use are very often disagreeable and as a rule differ considerably from smell and taste of sausages conventionally smoke-dried. Apart from this, the said preparations contain carcinogenic compounds such as 3,4-benzopyrene and 1,2,5,6-dibenzoanthracene, and also extraneous components.

*DETAILED DESCRIPTION*

The method according to the invention renders it possible to [remove] *avoid* the drawbacks of known smoke-preparations and permits the production of a preparation which when added to sausages not only imparts to them smell and taste very similar to those of conventionally smoke-dried sausages but which is simultaneously completely free from carcinogenic compounds and extraneous components.

The method according to the invention consists in that [the] wood distillation is carried out with a great excess of air, the arising smoke is entirely absorbed by *an* alkaline [solutions] *solution* and then selectively divided into chemical compounds with employment [only] of *only* the fraction which principally contains phenolic compounds while rejecting the remaining fractions containing noxious and superfluous compounds. It has been found that it is advantageous to use a 6–10 fold excess of air, aqueous solutions of sodium hydroxide or of calcium hydroxide being especially suitable for absorbing the smoke. The separation of individual fractions is carried out by [utilization of] *utilizing* the various [solubility] *solubilities* of these compounds in water and in organic solvents, especially in ethyl ether.

The example given below explains more fully the details of the method according to the present invention.

EXAMPLE

Oaken sawdust containing 40% by weight of moisture was burnt with an about 8-fold excess of air, with regulation of the heating of the sawdust from without and the air-flow in such manner as to obtain flameless combustion. The volatile combustion products were absorbed in an aqueous solution of 1 N NaOH. After the combustion was finished, the alkaline solution was subjected to extraction with ethyl ether for the purpose of dissolving the ketone compounds, the aldehyde compounds and the hydrocarbons. The ether layer was separated and carbon dioxide was introduced into the water layer for the purpose of converting the phenolates *contained therein* into free phenols. Then the phenols were extracted with ethyl ether, the ether layer was separated from the water layer and the ether was evaporated therefrom. The [obtained] product *obtained from the evaporated ether layer* in a quantity of 1.5 g. from 1 kg. of sawdust constituted the smoke-preparation. For practical use this preparation was dissolved in pork dripping in a quantity of 2 g. per 100 g. pork dripping. The obtained preparation when added during cutting the sausage raw material imparted to the ready made sausages an agreeable smell and taste which were difficult to distinguish from that obtained in conventionally smoke-dried sausages. The preparation contained no carcinogenic compounds since they were removed in the first fraction when the alkaline solution was extracted with ethyl ether.

For the production of the smoke-preparation according to the invention the wood most suitable is oak-wood and beachwood, but it is also possible to use other kinds of wood, also the wood of coniferous trees, but the yield of the process is then lower. Generally taken, from 1 kg. of sawdust with a moisture content of 30–60% by weight, one obtains 0.7–1.5 g. of the preparation which for facilitating the dosage is conveniently dissolved in fat or in another solvent.

We claim:

[1. Method of producing a smoke-preparation from products of wood distillation, characterized in that the wood distillation is carried out in a 6-fold to 10-fold excess of air, the arising smoke from the distillation is absorbed in an aqueous alkaline solution selected from the group consisting of sodium hydroxide solution and calcium hydroxide solution, extracting an ethyl ether soluble fraction of the aqueous alkaline solution with ethyl ether, separating and rejecting the ethyl ether layer thereby formed from the aqueous layer, introducing carbon dioxide into the aqueous layer to convert phenolates therein into phenols, extracting and separating said phenols from the aqueous layer with ethyl ether, separating said ether layer from the aqueous layer, whereby said aqueous layer fraction constituting the smoke preparation may be added to sausage material.]

*2. A method of producing a smoke-preparation from products of wood distillation adapted for addition to sausage material, said method comprising effecting wood distillation in a 6-fold to 10-fold excess of air, absorbing the arising smoke from the distillation in an aqueous alkaline solution selected from the group consisting of sodium hydroxide solution and calcium hydroxide solution, extracting an ethyl ether soluble fraction of the aqueous alkaline solution with ethyl ether, separating and discarding the ethyl ether layer thereby formed from the aqueous layer, introducing carbon dioxide into the remaining aqueous layer to convert phenolates therein into*

*phenols, extracting and separating said phenols from the aqueous layer with ethyl ether, and separating the thus formed ether layer from the aqueous layer, whereby said ether layer after evaporating the solvent constitutes the smoke-preparation.*

References Cited

The following references, cited by the Examiner, are of record in the patented file of this patent or the original patent.

UNITED STATES PATENTS 3,106,473 10/1963 Hollenbeck ---------- 99—229

OTHER REFERENCES

Husaini et al.: Food Technology, October 1957, pp. 499–502, incl., article entitled Fractionation of Wood Smoke and the Comparison of Chemical Composition if Sawdust and Friction Smokes.

HYMAN LORD, Primary Examiner

U.S. Cl. X.R.

99—109